United States Patent [19]

Cisaria

[11] Patent Number: 5,638,741
[45] Date of Patent: Jun. 17, 1997

[54] GROUP MODULE FOR COFFEE MACHINE

[76] Inventor: Salvatore Cisaria, 1015 Vista Del Pueblo, #2, Santa Barbara, Calif. 93101

[21] Appl. No.: 643,520

[22] Filed: May 6, 1996

[51] Int. Cl.⁶ .................................................. A47J 31/24
[52] U.S. Cl. .................................. 99/295; 99/302 R
[58] Field of Search .................................. 99/295, 302 R, 99/307, 316, 290, 291, 279, 300, 302 P, 317; 426/433

[56] References Cited

U.S. PATENT DOCUMENTS

| | | | |
|---|---|---|---|
| 3,599,557 | 8/1971 | Leal | 99/302 R |
| 3,824,914 | 7/1974 | Casiano | 99/302 R |
| 4,429,623 | 2/1984 | Illy | 99/295 |
| 4,644,856 | 2/1987 | Borgmann | 99/295 |
| 4,660,466 | 4/1987 | Fries | 99/302 R |

*Primary Examiner*—Robert W. Jenkins
*Attorney, Agent, or Firm*—Michael G. Petit

[57] ABSTRACT

A pod group module adapted for attachment to a coffee machine operable for receiving and sealably containing a prefabricated coffee pod and directing the flow of heated water therethrough. A coffee pod consists of a measure of pre-ground coffee beans contained within and enveloped by a water permeable membrane such as a filter paper. The pod group module includes attachment means adapted to mount a pod group module onto a coffee machine. The attachment means includes a flow channel having an intake port which is positioned to receive hot water from a hot water output port on the coffee machine. The pod group module includes a coffee pod receptacle adapted to receive a coffee pod. Activation of a lever-type handle on the pod group module doses and seals the pod receptacle providing a fluid-tight chamber containing the coffee pod. Upon command, heated water issues from the coffee machine's boiler and is conducted, under pressure, through the pod group module's intake pod and into the pressure- and fluid-tight chamber. As the hot water enters the chamber it is dispersed by means of a diffuser to evenly distribute the hot water prior to percolation through the coffee pod. The hot water exits the coffee pod chamber through a continuation of the flow channel in the pod group module. The hot water flowing out of the chamber, containing flavor components extracted from the ground coffee beans during passage through the coffee pod, finally exits the pod group module through a suitable outlet port such as a dispensing spout.

1 Claim, 3 Drawing Sheets

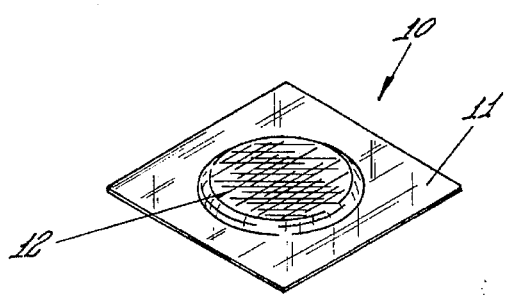
Fig 1
PRIOR ART
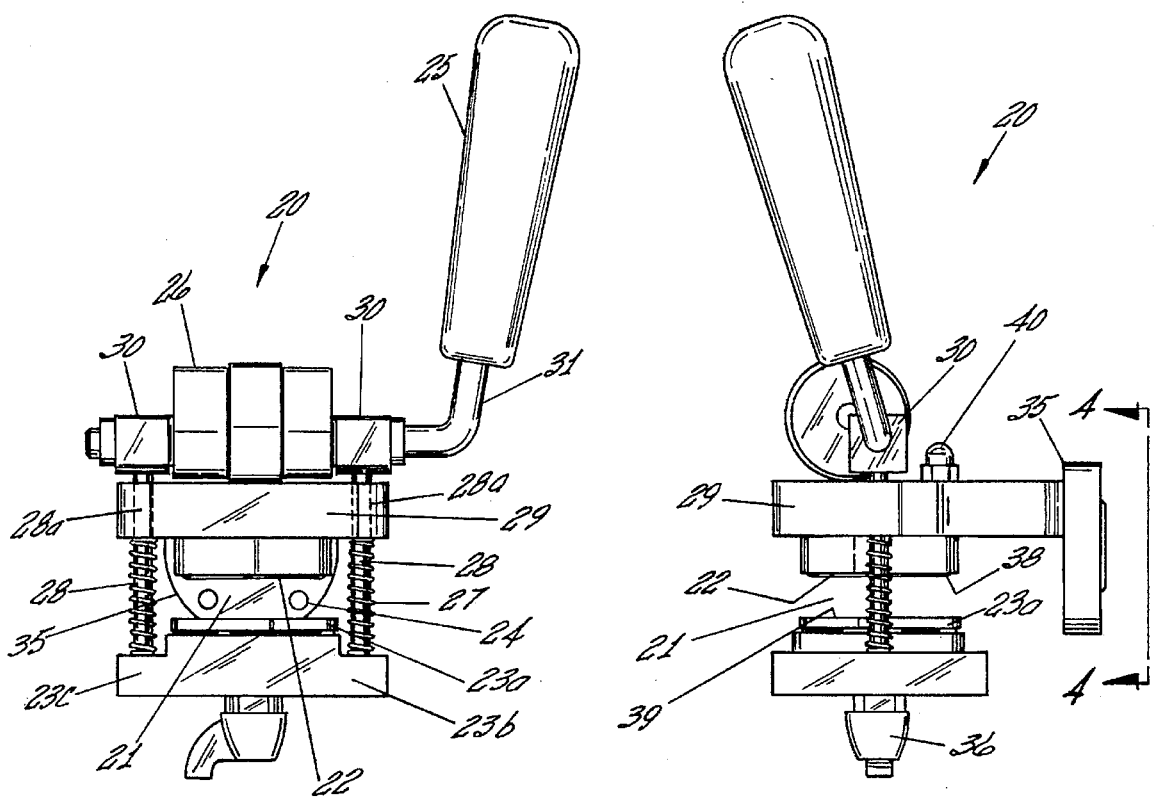
Fig 2
Fig 3
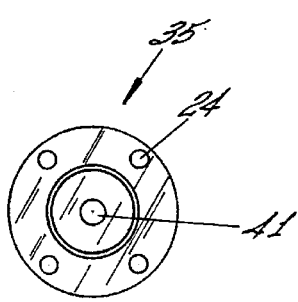
Fig 4

GROUP MODULE FOR COFFEE MACHINE

BACKGROUND OF THE INVENTION

1. Field of the Invention

This invention relates to coffee making machines and more particularly to an apparatus adapted for attachment to an espresso machine.

2. Prior Art

Espresso machines are currently enjoying worldwide popularity. Espresso machines use hot water to extract flavorful components from ground coffee beans and present the extract as a beverage suitable for drinking. A growing selection of coffee drinks as well as pure "shots" of espresso are available to connoisseurs and lay persons alike. Espresso coffee is the dark and rich by-product of forcing water at approximately 212 degrees Fahrenheit from the espresso machine's boiler through ground roasted coffee beans contained within a basket-like chamber in a removable group handle. Heated water from the machine's boiler is directed through a flow channel within the machine into a mating flow channel within a "group" attached to the machine, The "group" provides a flow channel for conducting hot water to coffee grounds housed in the receptacle within the removable group handle. The group also includes means for sealing the coffee grounds in the group handle receptacle to form a pressure-tight chamber. The hot water is injected into the chamber under pressure at approximately 140–145 psi and at a temperature of approximately 196 degrees Fahrenheit and brought into intimate contact with the ground beans. The hot water bearing the coffee extract exits the chamber and is conducted to a dispensing spout affixed to the underside of the group handle where the extract is directed into a cup or pitcher-type container. Espresso coffee drinks are variations on espresso coffee shots created by adding either steamed milk, frothed milk, whipping cream, flavored syrups or chocolate to the extracted espresso. The earliest espresso machines were manual press machines. Current espresso machines utilize the "twist-and-lock" type group handle receptacle and mating group handle, which are well known in the art.

With the plethora of retail outlets currently preparing and serving such drinks, it is difficult to reproduce and maintain the quality and sensual perception of a particular espresso beverage such as a double cappuccino from one outlet to another, or even within a single outlet if a non-professional operator prepares the beverage. It is, therefore, desirable to provide non-professional espresso machine operators with a reasonably foolproof, cost effective, consistent (standardized) and efficient means for making a quality espresso drink.

The error-prone manual process for preparing espresso in accordance with the prior art comprises the steps of:

(a) grinding roasted coffee beans to a desired consistency;
(b) measuring the correct amount of grinds;
(c) placing the grinds in a basket-like recess in the handle of a "twist-and-lock" group;
(d) tamping down the loose grounds within the basket-like recess of the group handle to the correct degree of compaction;
(e) twisting the group handle tightly into the group handle receptacle to seal the grounds within a leak-proof chamber;
(e) dispensing heated water in the correct volume to percolate through the compacted coffee grounds;
(f) untwisting and removing the group handle from the group handle receptacle;
(g) sharply hitting the group handle against a resilient object to dislodge the used, wet coffee grounds from the group handle's basket-like recess;
(h) check the coffee ground disposal container to make sure the group handle's filter screen has not become dislodged along with the spent espresso grounds; and
(i) return to step (a).

In response to the obvious drawbacks associated with espresso preparation employing manual "twist-and-lock" group procedures, several manufacturers have introduced a coffee pod consisting of a pre-measured volume of roasted, pre-ground and pre-compacted espresso coffee beans contained within a water permeable filter envelope. Coffee pod users merely place a coffee pod into a group handle receptacle within a "twist-and-lock" group handle wherein the handle and receptacle have been modified to receive a coffee pod. No grinding, measuring or tamping (compaction) is required. The group handle is then inserted into the group receptacle, twisted and locked to seal the coffee pod within the pressure-tight chamber and hot water injected into the chamber. When extraction is complete, the pod group handle is removed and one or two easy strikes against a resilient object removes the spent coffee pod from the pod group handle. When using a coffee pod, the machine operator must place the pod within the pod group handle, twist and lock the pod group handle to insure the pressure- and fluid-tight integrity of the extraction chamber formed within the sealed receptacle and make sure the filter screen within the pod group handles is not dislodged upon emptying.

Under optimal conditions, the espresso coffee pod offers high volume, non-professional espresso machine operators many benefits. First, the use of a coffee pod, requiring fewer subjective operator judgments, reduces operator error. This translates into saving money and time. Secondly, the pod virtually insures that each and every espresso shot is the same. This reproducibility in the preparation of espresso enhances the consistency of espresso containing beverages and permits quality standardization which is operator independent. Thirdly, emptying the pod group handle after use is less time consuming, simplified and quieter. Fourth, the coffee pod reduces wear and tear on expensive espresso machines and their parts. Fifth, many establishments or operators can actually eliminate the coffee grinder altogether. This eliminates mess, expense and down-time. And last but not least, coffee pods render espresso machines easier to clean and maintain, resulting in fewer service calls, further reducing down-time.

With the introduction of coffee pods, espresso machine manufacturers and coffee producers/distributors developed devices for adapting and retrofitting existing espresso machines to receive and utilize coffee pods. Such prior art adapters are referred to herein as a "pod adapter group". An example of a prior art pod adapter group can be seen in U.S. Pat. No. 4,429,623 to Ernesto Illy, issued Feb. 7, 1984, the content and teaching of which patent is incorporated herein by reference thereto. The Illy '623 patent discloses a device consisting of a two-part pod adapter group comprising a pod adapter portion and a pod receiving portion. The adapter portion comprises a hollow member having a first end adapted to releasably and sealingly engage a traditional group handle receptacle and receive hot water issuing therefrom and conduct the hot water to an outlet port on a second end thereof which end is adapted to attach to the pod receiving portion and provides a hot water flow channel therebetween. The second end of the adapter portion is configured to matingly engage the pod receiving portion and reversibly seal a coffee pod within a chamber within the hot water channel. The pod receiving portion is operationally similar to a non-pod-adapted twist-and-lock handle, having an end which is adapted to matingly, sealably and releasably engage the second end of the pod adapter portion; and further adapted to receive and contain a coffee pod. A flow channel within the pod receiving portion conducts hot water from the pod to an exit port.

Although many years have passed since the introduction of the coffee pod and the development of the Illy '623 pod adapter group to modify espresso machines to use such pods, surprisingly, even with the potential benefits offered by the coffee pod, especially in commercial applications, there remain significant problems with coffee pod use that have not been addressed. For example, coffee pods are more costly than coffee beans on a net weight basis. Also, current pod adapter group handles on espresso machines are still of the same familiar "twist-and-lock" type as was used to prepare espresso prior to the development of the coffee pod. Retail chains are concerned about preventing over-use injuries (i.e. carpal tunnel syndrome, "tennis" elbow, etc.) which are related to the repetitive motions required of espresso machine operators. Further, damage to the (relatively costly) coffee pods frequently occurs when used with a pod adapter group of the twist-and-lock variety such as Illy '623. The operator must insert the coffee pod into the recess within the pod group adapter handle very carefully prior to inserting, twisting and locking the pod receiving portion into the pod adapter portion in order to prevent tearing the filter paper surrounding the coffee grounds within the coffee pod. Torn coffee pod filter paper negates the potential advantages which may be realized by using coffee pods as such advantages relate to dislodging spent coffee grounds from the pod adapter group handle and reducing espresso machine maintenance and down-time. Additionally, and possibly more importantly, an operator must make sure that the entire coffee pod and all surrounding filter paper is correctly and completely inserted and seated within the pod adapter group handle's pod receptacle. The incomplete or incorrect insertion and improper seating of the coffee pod within the handle's pod receptacle results in: (a) an inability to "twist-and-lock" the pod receiving portion into the adapter portion; (b) damage to the coffee pod; (c) inability to achieve or retain a positive pressure and fluid-tight seal during the extraction operation; (d) leakage of hot water between the pod adapter and pod receiving portions; (e) potential operator injury; and (f) inconsistent quality of espresso extract.

Because the prior art pod adapter portion fits within and attaches to the traditional prior art non-pod-adapted group handle receptacle found on non-pod-adapted coffee machines, the dispensing spout on the pod receiving portion is lowered by the thickness of the pod adapter portion of the pod adapter group. This lowering of the dispensing spout reduces the space available for inserting a container to receive the espresso extract and renders only the shortest containers acceptable for capturing espresso extract. Since the pod receiving portion together with the pod adapter portion in the prior art pod adapter group device extends the flow channel to position the dispensing spout too low for operator comfort, Illy '623 has attempted to resolve the problem by making the pod receiving portion's pod seat flat. The combination of a low point of attachment for the pod receiving portion on the pod adapter portion and a flat pod seat on the pod receiving portion makes "using" the apparatus very difficult. In actual operation, a machine operator is unable see or "feel" where the locking prongs of the pod receiving portion containing the pod fit into the prong-receiving grooves of the pod adapter portion. Coffee pod filter paper, which may extend past the pod receiving portion's pod seat, further masks the "feel" of proper deployment as well as presenting a barrier to achieving a proper fit and seal during the extraction operation. Repeated attempts to blindly align, mate, twist and lock the pod receiving portion into the pod adapter portion exerts shear forces on the coffee pod which will either dislodge the coffee pod from it's flat seat or damage the filter paper surrounding the coffee grounds thus wasting valuable time and increasing the potential for all of the disadvantages described above.

The prior art pod adapter group devices employ a relatively flat seat in the receptacle within the pod adapter group handle which seat and receptacle have been especially designed for receiving and supporting a coffee pod within the handle. This feature, in conjunction with a pod adapter portion which extends and lowers the means for attaching the pod receiving portion on the pod adapter portion and twist-and-lock attachment means renders such prior art pod adapter devices difficult to use, damages the coffee pod, impairs positive sealing, presents a risk for contracting potentially debilitating over-use injuries, is inefficient and enhances contamination of fluid flow channels and espresso extract during operation. Thus, it is particularly desirable to provide a coffee pod group which can receive and dispose a coffee pod within a hot water flow channel of an coffee or espresso machine in such a way that the pod group is easy to use, efficient and safe, and presenting minimum opportunity for damage to the pod, leakage of hot water, and contamination of fluid flow channels and espresso extract with coffee grounds from a ruptured coffee pod.

SUMMARY OF THE INVENTION

It is an object of the present invention to provide a pod group for a coffee machine.

It is a further object of the present invention to provide at least one pod group for a coffee machine which pod group is adapted to receive a coffee pod comprising a portion of pre-ground coffee beans enveloped in, and contained by, a water-permeable membrane.

It is yet another object of the present invention to provide at least one pod group module which includes adapter means for installing the pod group module on a variety of conventional prior art coffee machines without requiring undue further machining.

It is still another object of this invention to provide a pod group module for a coffee machine having the above features and advantages and further having the advantage of ease of use, safety, and a reduction or elimination of operator-caused damage to coffee pods during preparation of coffee.

The present invention discloses a pod group module which, when properly mounted on a coffee or espresso machine as described herein, adapts the machine to extract flavor components from a coffee pod by bringing a volume of hot water in contact with the coffee pod and presenting the extract at a dispensing spout. The pod group module of the present invention has a mounting plate adapted for attachment to a prior art coffee machine to replace the group thereon. The pod group module of the present invention differs from the pod adapter group of the prior art in that a removable group handle is lacking in the present pod group module. The present pod group module consists of a member having a fluid flow channel therewithin, the flow channel having a hot water intake port which is integral with the mounting plate and a hot water outlet port consisting of a dispensing spout. A reversibly sealable receptacle within the pod group module receives a coffee pod placed therein by an operator and the receptacle is sealed to enclose the coffee pod in a pressure-tight leak-proof chamber disposed in series within the hot water flow channel. The opening and closing mechanism employed to seal the coffee pod within the flow channel within the pod group module does not require a twisting wrist action during operation nor exert any shear force on the fragile coffee pod envelope thereby meeting the objectives listed above.

These and other advantages of the invention will soon become apparent as we turn now to a brief description of the drawings in which:

BRIEF DESCRIPTION OF THE DRAWINGS

FIG. 1 is a perspective view of a prior art coffee pod showing a pre-measured, pre-ground and pre-compacted portion of espresso-roasted coffee beans contained within a water permeable envelope.

FIG. 2 is a front elevational view of a pod group module in accordance with the present invention.

FIG. 3 is a side elevational view of the pod group illustrated in FIG. 2 showing the pod receptacle open to receive a coffee pod.

FIG. 4 is a view of an embodiment of a pod group module mounting plate along view lines 4—4 of FIG. 3 which provides mounting means adapted for attaching the pod group module to an espresso machine having a matingly conforming means for attachment thereon.

DESCRIPTION OF THE PREFERRED EMBODIMENTS

Figure 5:
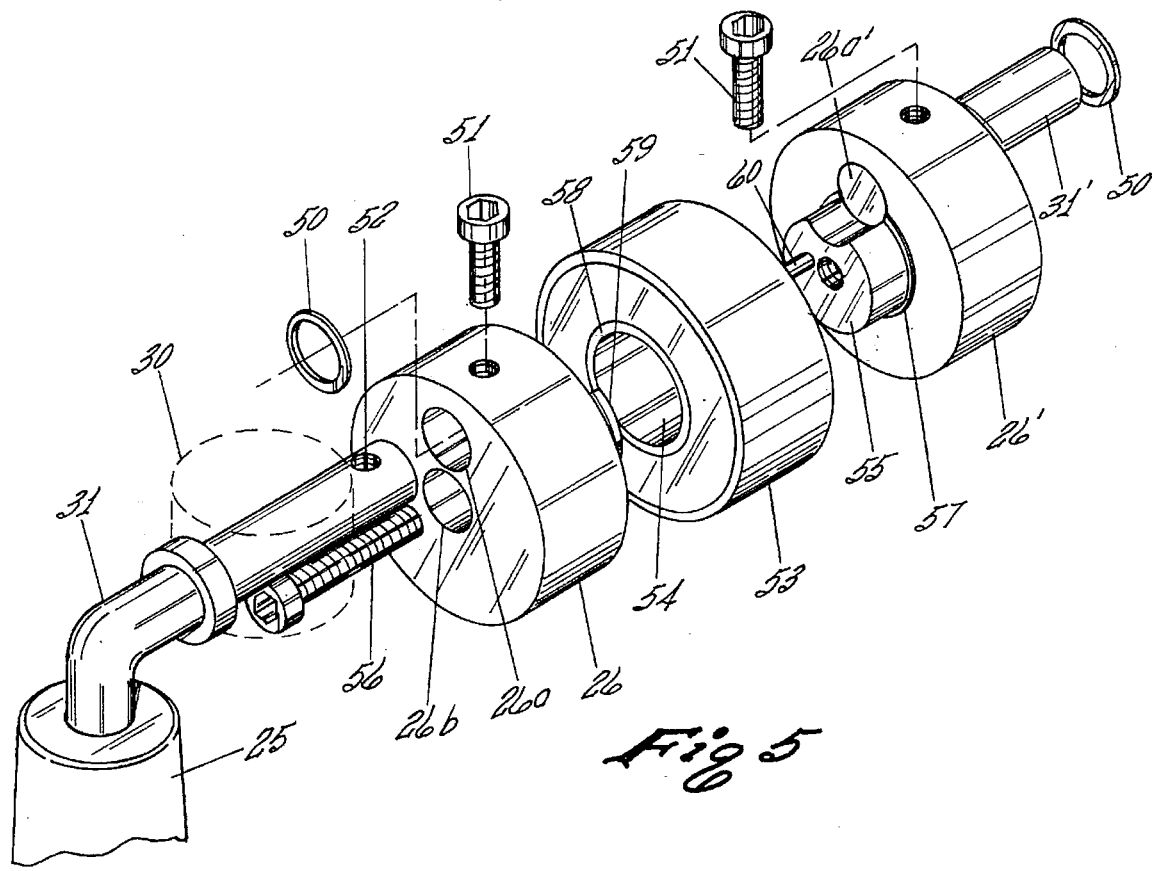
FIG. 5 is an exploded perspective view of the mechanism employed to open and close the coffee pod receptacle showing the construction of the eccentric cam and handle-driven cam shaft including a bearing disposed between the eccentric cams and mounted axially on the cam shaft.
Figure 6:
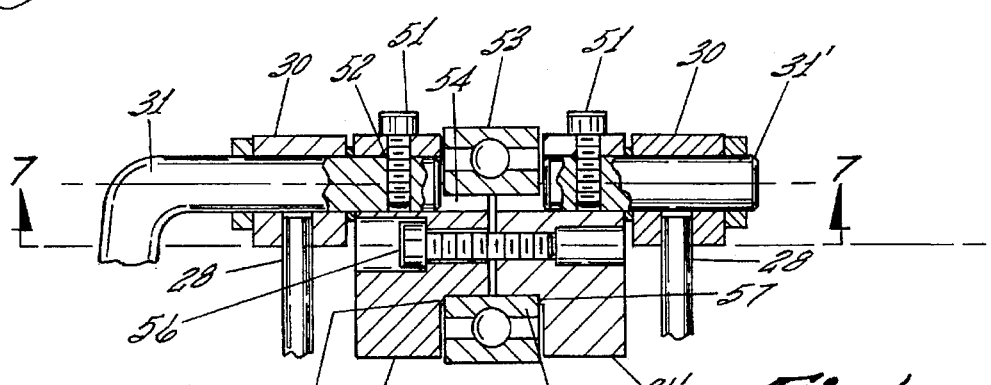
FIG. 6 is a front cross-sectional view of the cam shaft and handle portion of the pod group module of FIG. 5 showing the assembly of the components.
Figure 7:
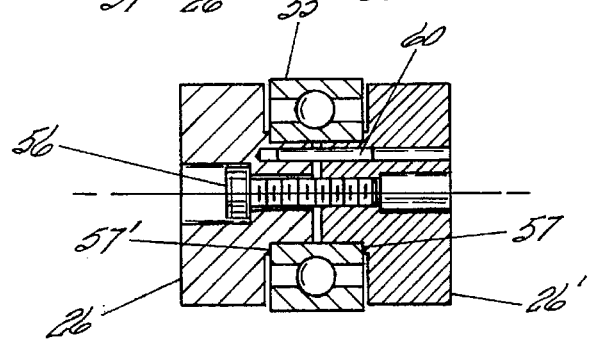
FIG. 7 is a cross-sectional view of the cam shaft handle assembly of FIG. 6 viewed along section line 7—7.

For the reasons stated in the foregoing discussion of the prior art, it is particularly desirable to pre-package a portion of ground roasted coffee beans within a water permeable filter membrane to form a coffee pod. Such a coffee pod 10, shown at numeral 10 in FIG. 1 lends itself to high volume use. The coffee pod 10 consists of a pre-determined weight of ground coffee beans 12 encased within and contained by a water permeable barrier membrane 11 such as a filter paper, fabric or the like. The coffee pod 10 may or may not have positioning flanges thereon which project laterally from the ground coffee and help to align or orient the coffee pod 10 within the pod receiving portion of a prior art group handle (such as shown at 23a in FIG. 2 of the Illy '623 patent).

As previously mentioned, the coffee pod 10, while taking much of the guess work out of preparing espresso beverages, is a fragile unit. In the event that the water permeable barrier 11 surrounding and containing the coffee grounds 12 is paper, as is the case with commercially available coffee pods, such a barrier membrane has low tensile strength, particularly when wet, and can be easily ruptured or otherwise compromised by applying a shearing force thereto. This is particularly apparent when a coffee pod 10 is used with conventional espresso machines. A "conventional espresso machine", as used herein, refers to an espresso machine wherein the group portion of the machine lacks means operable for receiving a coffee pod and sealing the received coffee pod within a fluid-tight chamber disposed within and forming a portion of the hot water flow channel. Similarly, a "prior art group" lacks means operable for receiving and employing coffee pods to make espresso. A "pod adapter group" refers to a group having mounting means adapted to attach the pod adapter group to a portion of a non-pod-adapted group of an espresso machine and adapted to receive and use coffee pods for preparing espresso in accordance with Illy '623. The term "fluid-tight chamber" as used herein, refers to a chamber having a water inlet port and a water outlet port, the chamber being in leak-proof fluid connection with and forming a portion of a hot water flow channel.

In a pod adapter group, a coffee pod 10 is placed on a seat (usually a filter screen) within a recess within the pod receiving portion which recess forms a portion of the extraction chamber, and the pod receiving portion is then inserted into the pod adapter portion. The operator applies torque to the pod receiving portion to twist and lock the pod receiving portion against a gasket surrounding the hot water inlet port within the pod adapter portion attached to the espresso machine. The shearing forces exerted upon the coffee pod which are present in a twist-and-lock chamber-sealing procedure can easily result in tearing the fragile filter paper envelope surrounding the ground coffee beans with concomitant clogging of the hot water flow channel and or entry of grinds into the espresso bean extract and beverage prepared therefrom.

FIG. 2 shows a pod group module in accordance with the present invention, generally indicated at 20, which is particularly adapted to replace a prior art group on an espresso machine which prior art group lack means for receiving and interposing a coffee pod 10 within a hot water flow channel for preparing espresso. The pod group module 20 is easily affixed to a prior art espresso machine (not shown) to replace the prior art group by means of a mounting plate (FIG. 3, numeral 35), having mounting holes 24 therewithin which are positioned to enable attachment of the pod group module 20 to the espresso machine so that a fluid-tight connection is formed between a hot water outlet port on a prior art espresso machine (not shown) and a hot water flow channel. The pod group module 20 includes a pod receptacle 21 in which a coffee pod 10 may be placed. The pod receptacle 21 is an open-sided, sealable pod-shaped chamber disposed within and part of a hot water flow channel within the pod group 20. The pod group receptacle 21 includes two opposed cup-shaped recesses in parallel plates which are separated by a space through which a coffee pod 10 may be inserted. When the parallel plates are brought together, the concave recesses in the plates form a chamber similar to opposing shells of a clam. The pod receptacle 21 has a smooth upper surface and consists of a diffuser head 22 which is a concave recess within the stationary upper platen 29 having a smooth surface and which disperses the flow of hot water entering the receptacle 21. The pod receptacle 21 is bounded on the lower surface thereof by a removable pod filter screen 23a which is supported by a pod filter support platen 23b. The pod filter screen 23a is a concave sieve, presenting a fenestrated but otherwise smooth lower surface housed within a recess in the pod filter support platen 23b which recess and pod filter are shaped to matingly conform to the exterior shape of a coffee pod 10 placed thereon. The filter support platen 23b is preferably a unitary metallic plate having flanges 23c extending laterally from the filter screen 23a and which flanges 23c are rigidly affixed to guide pins 28 which guide pins 28 project upwardly therefrom. The guide pins 28 extend upward through tensioning springs 27 and slideably through guide holes 28a (shown in phantom in FIG. 2) in the stationary upper platen 29 and project beyond the upper surface thereof where the upper end of the guide pins 28 are rigidly affixed to a guide pin receptacle 30. The guide pin receptacle 30 is axially mounted on and supported by a cam shaft 31 which cam shaft 31 rotates in response to motion of a handle 25. The cam shaft 31 rotates freely within the guide pin receptacles 30. When the handle 25 (shown in the upward, open position in FIG. 2) is manually lowered, the cam shaft 31 rotates causing an eccentric cam 26 which is rigidly affixed to the cam shaft 31 to rotate causing the guide pins 28 and pod filter support platen 23b to draw upward, lifting the support platen 23b as the rotating eccentric cam 26 progressively bears against the stationary upper platen 29. A coffee pod (not shown in FIG. 2) which has been manually placed within the open pod receptacle 21 by an operator is sealed in the chamber formed between the diffuser head 22 within the stationary upper platen 29 and the pod filter screen 23a within the filter support platen 23b.

Turning now to FIG. 3, the pod group module 20 in accordance with the present invention is shown in elevational side view. The stationary upper platen 29 has a mounting plate 35 integral therewith (shown more clearly in FIG. 4) which is adapted to rigidly but removably attach to a prior art espresso machine (not shown) so that the hot water outlet port within the prior art espresso machine is aligned with and in fluid-tight connection with the pod group module's 20 hot water intake port 41 on the mounting plate 35. A hot water flow channel, a portion of which hot water flow channel is shown at numeral 81 in FIG. 8, within and passing through the mounting plate 35 and stationary upper platen 29 conducts heated water issuing from the hot water outlet port of the prior art espresso machine through the stationary upper platen 29, into the diffusion chamber 22 which forms the upper surface of the pod receptacle 21. A coffee pod is manually placed in the receptacle 21 and the receptacle 21 is closed by means of the handle 25 as shown in FIG. 9. The hot water enters the diffusion chamber 22 and percolates through the filter paper of the coffee pod contained within the sealed receptacle 21. An extension of the hot water channel within the filter support platen 23b below the pod filter screen 23a conducts hot water bearing a coffee extract through the pod filter support platen 23b into the upper portion of the dispensing chamber 22. The hot water containing the extract then exits the pod group module through a lumen within an optional spout affixed the dispensing head 36 and is collected in a receptacle of the operator's choice (not shown). The diffusion chamber 22 is bounded peripherally by an o-ring 38 which o-ring seats into a mating groove 39 on the top lip of the pod filter screen 23a when the stationary upper platen 29 and the pod filter screen 23a are brought into juxtaposition and provides a fluid-tight circumferential seal between the plates which converts the open-sided sealable pod receptacle 21 into a sealed, extraction chamber disposed in series connection with the hot water flow channel 81.

The pod receptacle 21 is dimensioned to receive and contain the portion of the coffee pod 10 containing the ground coffee. Once the coffee pod 10 is in position; resting on and supported by the filter screen 23a, the operator lowers the handle 25 which motion rotates the cam shaft 31 and the eccentric cam 26 which forces the guide pins 28 upward by elevating or lifting the guide pin receptacles 30 which are supported by the cam shaft 31 until the annular groove 39 surrounding the pod filter screen 23a is in juxtaposition with the o-ring 38 which circumferentially bounds the diffusion chamber 22 thereby sandwiching the coffee pod 10 therebetween converting the open-sided, accessible pod receptacle 21 into a fluid-tight extraction chamber disposed within and forming a portion of the hot water flow channel 81. An adjustable stop 40 insures that the cam shaft 31 ceases its rotation at an optimal position which locks and seals the fluid-tight extraction chamber 21. The stop 40 prevents the handle 25 from being hyperextended causing the o-ring to over-compress thereby damaging to the pod group module 20, particularly the portions of the receptacle 21 which form the wall of the sealed extraction chamber 21; the diffuser chamber 22, the pod filter screen 23a or causing damage to the coffee pod 10.

FIG. 5 shows an exploded perspective view of a preferred cam and cam shaft assembly used for sealing the pod group receptacle 21. The assembly includes two eccentric cams 26 and 26' and a bearing 53 disposed therebetween. The bearing 53 has an outer race 53a and an inner race 58. A boss or shoulder 57 on eccentric cams 26 and 26' interlock with the inner race 58 of bearing 53. A bolt 56 passes through hole 26b on cam 26 and the center of bearing 53. The bolt 56 is screwed into a threaded hole 26b' in cam 26' thereby holding the cams 26 and 26' together. A locating pin 60 may advantageously be used to align the two cams 26 and 26' during assembly. The cam shafts 31 and 31' are inserted into the cams 26 and 26' as shown and locked therewithin by bolts 51 which rigidly affix eccentric cams 26 and 26' to cam shafts 31 and 31'. Shims 50 act as a bearing surface between guide pin receptacles 30 (shown in phantom in FIG. 5) and cams 26 and 26'. As the cam shaft 31 turns, the shim 50 acts as a low friction bearing surface therebetween. The bearing 53 has an outer race 53a which has a larger diameter than the outer diameter of eccentric cams 26 and 26'. Consequently, the outer race 53a of bearing 53 makes first contact with the top surface of the stationary upper platen 29. As the cam shaft 31 is rotated the shoulders 57 on eccentric cams 26 and 26' engage the inner race 54 of bearing 53 which continues to turn, lifting guide pins 28 and compressing tensioning springs 27. The guide pin receptacles 30, being affixed to guide pins 28, lift the filter support platen 23b toward the stationary platen 29. Once the receptacle 21 is fully closed to form an extraction chamber, continued further rotation of the handle 25 causes the cams 26 and 26' to rotate past the point of highest lift. When the maximum lift of the cam shaft 31 is exceeded further rotation is prevented by stop 40 and the handle is held in position by the tensioning springs 27.

Figure 8:
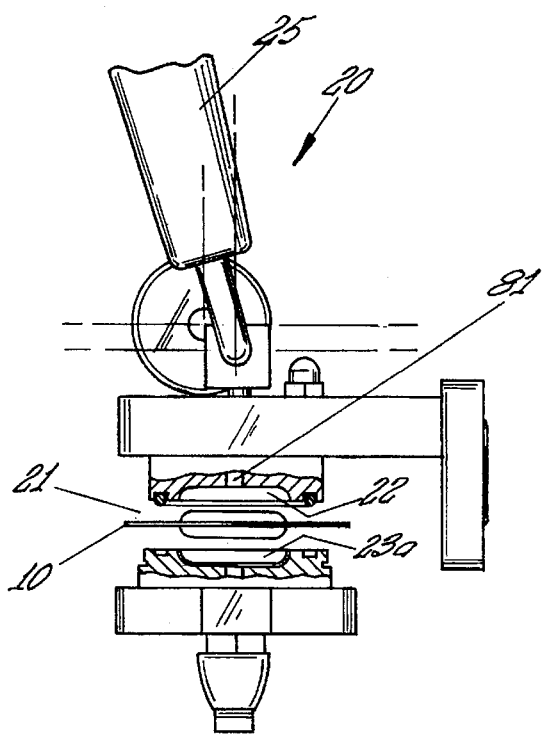
FIG. 8 shows a partial cross-sectional side elevational view of a coffee pod positioned within the pod receptacle of the pod group module of FIG. 3 prior to sealing the receptacle.
Figure 9:
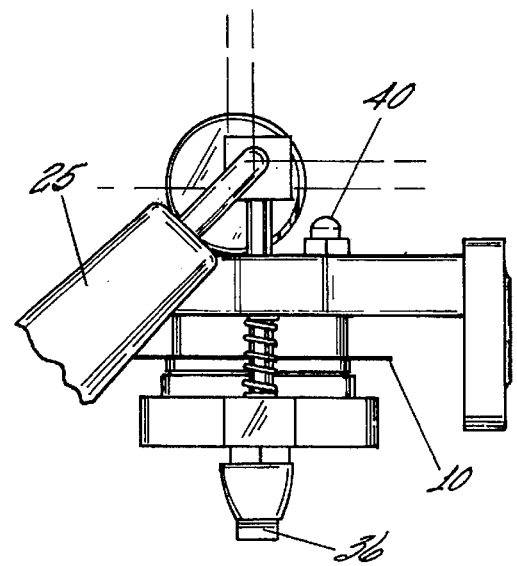
FIG. 9 is as FIG. 8 but wherein the pod receptacle is closed and sealed to form a fluid-tight chamber enclosing the coffee pod within the hot water flow channel of the pod group module.
Figure 10:
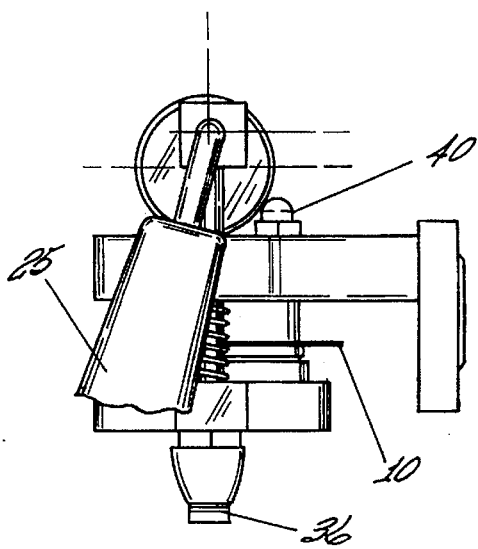
FIG. 10 is in accordance with FIG. 9 with handle positioned for extraction.

Sequential elevational views of the pod group module in accordance with the present invention is shown in operation in FIGS. 8, 9 and 10. A coffee pod 10 is manually inserted into the open pod receptacle 21 of the pod group module 20. Following coffee pod insertion, the handle 25 is rotated through an angle sufficient to drive the eccentric cam 26 against the stationary platen 29 to draw the support platen 23b upward until the o-ring 38 on the stationary platen 29 is compressed therebetween sealing the coffee pod 10 within the receptacle 21. Hot water from the coffee machine's boiler enters the pod group module through the hot water inlet port 41 in the mounting plate 35 and passes through a flow channel 81 within the mounting plate 35 and the stationary platen 29 to the diffuser chamber 22 forming a wall of the receptacle 21. The hot water percolates through the sealed receptacle 21 extracting flavor components from the coffee grounds within the coffee pod 10 and exits my means of a dispensing head 36 affixed thereto.

Alternate embodiments for adapting the pod group module of the present invention to be installed on prior art espresso, coffee and tea brewing machines can easily be achieved by providing an adapter plate. Such an adapter plate will serve to modify the location and or number or size of the mounting holes 24 as well as the hot water channel 36 of the pod group module which, in combination, mate with any prior art coffee machines. Such modifications are, of course, obvious to one of normal skill in the art. In addition, more that one coffee pod receptacle may be incorporated within the pod group module of the present invention. For example, a variety of receptacles can be employed which are adapted to receive a coffee pod containing a double portion of ground coffee beans to brew a "doppio" or other beverage derived therefrom wherein more than one shot of espresso is needed. Further, the pod receptacle of the pod group module may accommodate a tea pod (tea bag) rather than a coffee pod, or the pod receptacle may be dimensioned to accept a prior art coffee pod used to brew quantities of "American"-type coffee.

While particular embodiments of the present invention have been illustrated and described, it would be obvious to those skilled in the art that various other changes and modifications can be made without departing from the spirit and scope of the invention. It is therefore intended to include in the appended claims all such changes and modifications that are within the scope of this invention.

What I claim is:

1. An apparatus comprising a pod group adapted for attachment to a coffee machine, said coffee machine having a hot water outlet port and a hot water supply means operable for providing a controllable flow of hot water through the hot water outlet port upon demand, said apparatus providing means for receiving a coffee pod comprising a measured portion of ground coffee beans enveloped by and contained within a water permeable membrane, and for extracting flavor components from the coffee pod by directing the flow of hot water through the coffee pod and presenting the hot water bearing the extract at a dispensing orifice, said apparatus comprising, in combination:

(a) a mounting plate adapted for releasably and rigidly attaching said apparatus to said coffee machine and having a hot water intake port adapted to provide leak-proof fluid flow communication with said hot water outlet port of said coffee machine when said mounting plate is attached to said coffee machine;

(b) a coffee pod receptacle having a movable lower surface and a stationary upper surface, said coffee pod receptacle providing means operable for receiving and containing said coffee pod, said lower and upper surfaces of said coffee pod receptacle being a upwardly concave recess within the surface of a movable plate and a downwardly concave recess within the surface of a stationary plate respectively;

(c) coffee pod receptacle sealing means operable for forcing said moveable plate and said stationary plate into juxtaposition thereby sealing said coffee pod receptacle; and (d) a hot water flow channel providing means operable for conducting the flow of hot water from said hot water intake port into said coffee pod receptacle and for conducting hot water from said coffee pod receptacle to a dispensing orifice.

* * * * *